Dec. 12, 1939.  K. E. STUART  2,183,299
MEANS FOR SUPPLYING ELECTROLYTE TO ELECTROLYTIC CELLS
Filed Sept. 23, 1937

INVENTOR.
Kenneth E. Stuart

Patented Dec. 12, 1939

2,183,299

UNITED STATES PATENT OFFICE 2,183,299

MEANS FOR SUPPLYING ELECTROLYTE TO ELECTROLYTIC CELLS

Kenneth E. Stuart, Niagara Falls, N. Y., assignor to Hooker Electrochemical Company, New York, N. Y., a corporation of New York Application September 23, 1937, Serial No. 165,383

5 Claims. (Cl. 204—5)

My invention relates more particularly to means for supplying electrolyte to electrolytic cells in constant predeterminable quantity per unit of time. In the operation of electrolytic cells such as alkali chloride cells, in which a permeable diaphragm is used to separate the anode compartment from the cathode compartment, the brine which constitutes the electrolyte is fed into the anode compartment and passes through the diaphragm to the cathode compartment, whence it issues with a certain proportion of its dissolved salts electrolyzed to the hydroxide of the alkali metal. No matter how carefully the brine may have been purified and filtered, it always carries minute quantities of lime and foreign matter, both organic and inorganic. Moreover, the anodes of the cell, which are of graphite, are slowly disintegrated and particles of graphite detached. This lime, graphite and foreign matter is largely deposited in the pores of the diaphragm, which therefore becomes less and less permeable. If a constant head be maintained upon the diaphragm, the percolation rate will therefore progressively decrease. Under these circumstances it is necessary, in order to maintain good current efficiency, to allow the current to decrease in the same ratio, which it tends to do automatically if the voltage be maintained constant; but this results in a reduction in the output of the cell and hence a variation in output of the plant. An alternative method of operation is to maintain the current constant and feed a constant quantity of brine to the cell, allowing the head upon the diaphragm to build up automatically to whatever level may be necessary in order that the percolation may be maintained at a constant rate corresponding to the current.

In U. S. patents, Nos. 1,388,474 and 1,423,584, dated August 23, 1921, and July 25, 1922, respectively, there was disclosed a means for supplying brine to alkali chloride cells in constant quantity through calibrated orifices upon which a constant head of brine was maintained. In order to prevent short circuiting or grounding of cells through the streams of brine, the latter was supplied from an overhead pipe and caused to fall vertically through the atmosphere for a sufficient distance to allow the streams to break up into droplets. The streams of brine were then collected in funnels and conducted thence to the cells. In the particular embodiment disclosed in the patents referred to, for reasons therein stated, the brine carried a certain proportion of undissolved salt which was delivered to the cells through a main supply pipe formed into a closed circuit with a pump, the salt being maintained in suspension by rapid circulation of the stream in the pipe. On account of this salt it was necessary to let the orifices directly into the under side of the pipe in which the brine was circulating, where they would be swept by the main stream, and to avoid pockets or recesses which could fill up with salt. After the measured streams of brine had passed through the orifices and been collected in the funnels it was necessary for the same reason to carry them in free and unhindered flow downward to the cells. The streams of brine and solid salt falling through the atmosphere into the funnels lost water by evaporation and had a tendency to deposit an encrustation of salt at the tip of the orifices and upon the walls of the funnels and this salt not only affected the calibration of the orifices but occasionally obstructed the pipes leading to the cells. The funnels would then overflow, and the cells and floor would be splashed with brine. Moreover, this system of operation involved considerable expenditure of power for circulation of the main brine stream.

For these reasons I have devised a system of saturating the brine at an elevated temperature at which salt is more soluble than at ordinary temperatures, thus avoiding the necessity for feeding to the cells brine containing undissolved salt in suspension. At the same time the temperature of the cells is raised and this tends to improve their operating efficiency. This system is disclosed in my co-pending application Serial No. 145,392, filed May 28, 1937, now Patent 2,173,986, dated September 26, 1939. The brine supplied to the cells in accordance with my present invention is preferably that produced in accordance with the method of the copending application. In any case my present invention differs from that of the patents referred to in that the brine carries no salt in suspension, therefore there is no need for agitation in the main brine supply pipe; neither is there any need to let the orifices directly into the main supply pipe or advantage in doing so. Consequently, the orifices may be and preferably are supplied through branch pipes and these may extend upwardly. This permits them to be placed so as to discharge directly into the cells. Evaporation of moisture and salt encrustation are thereby eliminated. However, since the height within the cell is limited this increases the difficulty of avoiding the grounding of the cells through the brine stream. My invention therefore includes a new type of orifice adapted to cause the stream to break into droplets within a short distance of the orifice. Since this occurs within the cell, loss of heat, which would largely defeat one of the objects of this invention, is obviated.

In Patent No. 1,866,065 granted to me on July 5, 1932, there was illustrated a type of alkali chloride cell in which the brine was delivered through a nozzle placed within the cell, but this nozzle was of the ordinary type adapted to cause a smoothly flowing stream. The purpose of this nozzle was to produce a jet of considerable velocity which by its impact upon the surface of the body of electrolyte would set up a circulation therein. This nozzle was intended to be used in connection with the system of overhead orifices provided with air gaps for breaking up the stream as described in the earlier patent referred to; otherwise the stream from this nozzle would ground the cell to the brine supply pipe, consequently cause short circuiting from cell to cell. In my present invention, as already stated, this grounding of the cells is largely avoided.

By this new system for supplying brine to the cells I have therefore secured the advantages which accrue from supplying to the cells brine carrying excess salt, without the consumption of power otherwise necessary to maintain the salt in suspension and without the inconvenience resulting from encrustation of salt and the splashing of brine above referred to. Moreover, by supplying heat to the cells through the medium of the brine and avoiding loss of this heat by causing the brine stream to break within the cell itself, I have improved the operating efficiency of the cells.

Referring to the drawing.

Figure 1:
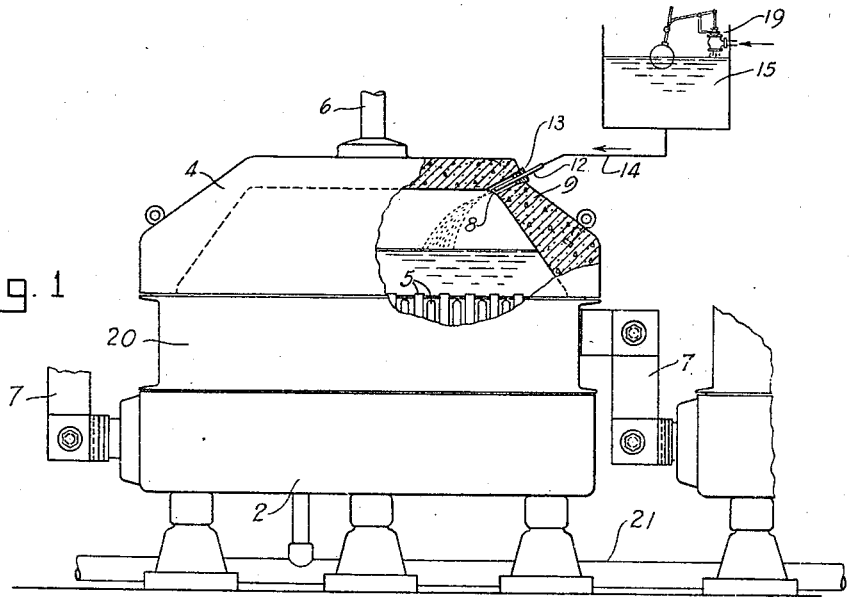
Fig. 1 is a side elevation of an alkali chloride cell of the type illustrated and claimed in Patent No. 1,866,065 above referred to, but equipped with my new brine feed orifice. The top portion of the cell is partially broken away to show the orifice and the stream of brine from it entering the cell.

Referring to Fig. 1:

2 is a bottom member of concrete serving to support the anode assembly, 20 a steel cathode member and 4 a concrete top or cover member. The electrode members, consisting of alternating anode blades of graphite and hollow foraminous cathode compartments coated with permeable asbestos diaphragm, are partially disclosed at 5. Above the electrode members the cover 4 forms a storage space for brine and a gas chamber for chlorine, which is discharged through pipe 6. The liquid product is carried away by pipe 21. The electric current passes from cell to cell in series through the conductors 7. The further details of the cell are not relevant to the present invention.

An opening 8 is formed in the wall 9 of the cover member 4 and through this opening the supply of brine to the cell is introduced.

Figure 2:
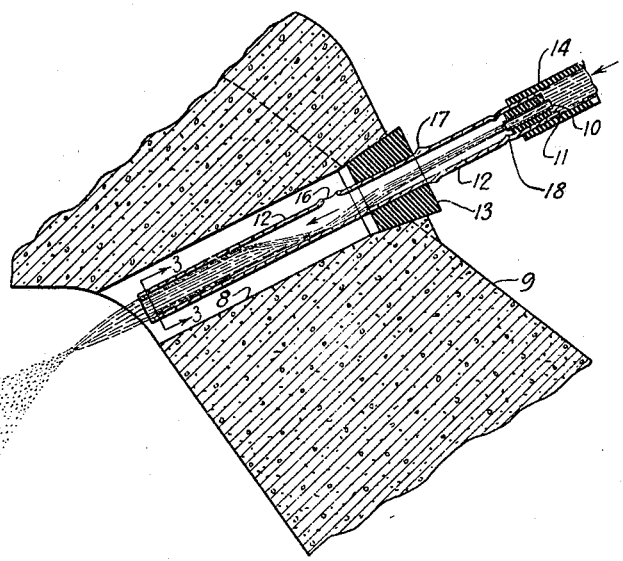
Fig. 2 is a detail of the brine feed orifice showing not only its construction but also its manner of functioning, by which the brine stream is broken up into droplets close to the orifice.

Referring to Figs. 1 and 2:

The supply of brine to the cell is controlled by maintaining a regulated pressure of brine upon a standardized flow-controlling restricted passage or orifice 10, consisting preferably of a short piece of drawn metal tube of precise internal diameter and accurate length. This orifice tube is snugly fitted into a hole formed axially in a rubber stopper 11 beyond which it extends for a short distance at each end. This stopper is pressed firmly into the end of tube 12, preferably of glass, which is long enough to extend through the opening 8 in the concrete wall of the cell top and project for some distance outside. The glass tube 12 is fitted tightly into a hole formed preferably axially in rubber stopper 13, which is firmly pressed into the tapered outer end of opening 8. Stoppers 11 and 13 form gas-tight closures with the orifice tube 10, glass tube 12 and walls of opening 8. The tube 12 extends outside stopper 12 for a sufficient distance to permit rubber hose 14 to be slipped over it. Hose 14 serves as a connection from the orifice to a source of brine, such as the storage reservoir indicated diagrammatically at 15, Fig. 1. In practice, reservoir 15 would of course serve a large number of cells through a pipe corresponding to pipe 21, but for simplicity it is shown as connected directly to the cell. The brine in reservoir 15 is maintained at constant level, as by float valve 19, or other means. Reservoir 15 may be the corresponding portion of the apparatus for saturating the brine at elevated temperature illustrated in my copending application above referred to.

Glass tube 12 has an interior diameter about three times that of orifice tube 10, and this relationship is important. Tube 12 is inclined at an angle of 20 to 30 degrees with the horizontal. The velocity of the stream issuing from orifice tube 10 depends of course upon the head maintained upon it and the feed of brine to the cell depends upon the interior diameter of tube 10 and the velocity of the brine through this tube. These two factors are regulated so as to result in a velocity of twelve to fifteen feet per second, at which velocity the parabolic path of the stream after leaving the orifice has an appreciable curvature and the stream from the orifice impinges upon the interior wall of the glass tube 12. Thus, in practice for a cell designed to operate at 6,000 amperes the orifice tube may be .120 inch in bore and the glass tube ⅜ inch inside diameter and eight inches long. Under these conditions the stream strikes the interior wall about three inches from the end. It is essential that the stream strike the interior of the tube, otherwise the phenomena about to be described will not occur. When the stream impinges upon the inner wall as just described it spreads sharply around its inner periphery, forming a complete hollow cylindrical liquid sheet within the tube. Owing probably to surface tension or "vena contracta", the stream issues from the tube as a perfect hollow cone with an apex about one inch from the end of the tube, as illustrated in Fig. 2. At the apex of the cone the liquid flies into droplets which spread at a considerable angle. Within two or three inches from the tip of the glass tube 12 the stream is dispersed or comminuted so that it will not conduct electric current to any considerable extent.

The conical sheet of liquid leaving the glass tube entrains air or gas with it, and will quickly create a considerable vacuum in the tube if permitted to do so. Such a vacuum is likely to cause the brine to fill up the tube solidly, thus resulting in a stream of large cross section and low velocity which will ground the cell. To prevent this, a vent hole is preferably formed in the wall of the tube 12 as illustrated at 16.

The glass tube 12 is provided with an outwardly extending bead 17 to prevent it from being pushed too far through stopper 13 and an inwardly extending bead 18 to prevent stopper 11 from entering too far. The distance between bead 17 and the end of hose 14 is sufficient to leave an inch or more of the tube 12 exposed, and through this portion the stream flowing within is visible. This provides a ready method of determining visually whether the stream is flowing properly.

The relationship between the bore of the orifice tube and diameter and length of the glass tube and of both to the capacity of the cell in which they are to operate is important. The angle with the horizontal at which the apparatus is set to work is also a factor in the result. Nevertheless, these relationships are not extremely critical and the same apparatus can be regulated to operate over a range of ten per cent or more either way from the designed flow of brine. Such regulation is effected by varying the height of brine in reservoir 15. The supply of brine to an entire circuit of cells operated from one brine reservoir can therefore be regulated to correspond with a change in current by a simple adjustment of a float valve, for example, in the reservoir, requiring only a few minutes to effect.

The orifice tube 10 is exposed to hot, wet nascent chlorine and also to the abrasion of a hot brine stream which is likely to be slightly alkaline. It is found that glass nipples are not sufficiently accurate for the purpose, nor will they long endure the conditions of operation. The best material that has been found for this purpose is tantalum, which can be drawn with great accuracy and resists the severe conditions of operation indefinitely.

Although I have stated that I prefer to use the hot-saturated brine of my co-pending application, I do not wish to be limited thereto, as my invention is obviously applicable to the feeding of cold or unsaturated brine or other electrolyte to electrolytic cells in constant quantity per unit of time or otherwise.

Although I have illustrated a gravity means of supplying electrolyte I do not wish to be restricted thereto, as other means, such as pump means, for supplying electrolyte at constant pressure could obviously be substituted. Neither do I wish to be limited to the exact form of flow-controlling orifice illustrated, since other means for causing a stream of relatively high velocity to impinge upon the interior wall of the glass tube 12 near its open end, such as a reduction in diameter of the tube itself, will occur to anyone skilled in the art.

I claim as my invention:

1. In a system for supplying electrolyte to electrolytic cells the combination with an electrolytic cell of a downwardly inclined conduit opening directly into said cell above the level of the electrolyte therein and insulated from said electrolyte, a restriction in said conduit positioned and directed to impinge a high velocity stream of electrolyte of a cross section smaller than said conduit against a lower interior wall of said conduit near the discharge end thereof and at an oblique angle with said conduit, a source of supply of electrolyte and a pressure-tight conduit connecting said restriction with said source, whereby under suitable pressure at said source a stream of electrolyte is delivered to said cell in discontinuous droplets which will not to any considerable extent conduct electric current between the main body of electrolyte in the cell and said source of supply.

2. In a system for supplying electrolyte to electrolytic cells the combination with an electrolytic cell of a downwardly inclined transparent tubular conduit extending from outside said cell through a wall thereof and opening directly into said cell above the level of the electrolyte therein, a restriction in said conduit outside said wall positioned and directed to impinge a high velocity stream of electrolyte of a cross section smaller than said conduit against a lower interior wall of said conduit near the discharge end thereof and at an oblique angle with said conduit, said stream being visible in part through said transparent conduit outside said cell, a source of supply of electrolyte and a pressure-tight conduit connecting said restriction with said source, whereby under suitable pressure at said source a stream of electrolyte is delivered to said cell in discontinuous droplets which will not to any considerable extent conduct electric current between the main body of electrolyte in the cell and said source of supply.

3. In a system for supplying electrolyte to electrolytic cells the combination with an electrolytic cell of a downwardly inclined open ended tubular conduit projecting into said cell above the level of the electrolyte therein and insulated from said electrolyte, a closure in said conduit located at a distance of about 21 diameters of said conduit from the discharge end thereof, and a relatively small orifice in said closure directed longitudinally of said conduit and adapted to impinge a high velocity stream of electrolyte against a lower interior wall of said conduit near the discharge end thereof and at an oblique angle therewith, a source of supply of electrolyte and a pressure-tight conduit connecting said orifice with said source, whereby under suitable pressure at said source a stream of electrolyte is delivered to said cell in discontinuous droplets which will not to any considerable extent conduct electric current between the main body of electrolyte in the cell and said source of supply.

4. In a system for supplying electrolyte to electrolytic cells the combination with an electrolytic cell of a downwardly inclined tubular conduit opening directly into said cell above the level of electrolyte therein and insulated from said electrolyte, a restriction in said conduit positioned and directed to impinge a high velocity stream of electrolyte of cross section smaller than said conduit against a lower interior wall of said conduit near the discharge end thereof and at an oblique angle with said conduit, a vent hole through the wall of said conduit located between said restriction and the point of impingement of said stream upon said interior wall and communicating with the interior of said cell, a source of supply of electrolyte and a pressure-tight conduit connecting said restriction with said source, whereby under a suitable pressure at said source a stream of electrolyte is delivered to said cell in discontinuous droplets which will not to any considerable extent conduct electric current between the main body of electrolyte in the cell and said source of supply.

5. In a system for supplying electrolyte to electrolytic cells the combination with an electrolytic cell of a downwardly inclined conduit opening directly into said cell above the level of the electrolyte therein at an angle of 20–30° with the horizontal and insulated from said electrolyte, a closure in said conduit, an orifice in said closure having a diameter substantially ⅓ of the diameter of said conduit and adapted to impinge a high velocity stream of electrolyte against a lower interior wall of said conduit near the discharge end thereof and at an oblique angle therewith, a source of supply of electrolyte, and a pressure-tight conduit connecting said orifice with said source, whereby under suitable pressure at said source a stream of electrolyte is delivered to said cell in discontinuous droplets which will not to any considerable extent conduct electric current between the main body of electrolyte in the cell and said source of supply.

KENNETH E. STUART.